United States Patent
Li

(10) Patent No.: US 6,359,057 B1
(45) Date of Patent: Mar. 19, 2002

(54) MODELING DOUGH AND METHOD OF MAKING THE SAME

(75) Inventor: Jie Li, Bethlehem, PA (US)

(73) Assignee: Binney & Smith, Inc., Easton, PA (US)

( * ) Notice: Subject to any disclaimer, the term of this patent is extended or adjusted under 35 U.S.C. 154(b) by 0 days.

(21) Appl. No.: 09/500,565

(22) Filed: Feb. 10, 2000

(51) Int. Cl.$^7$ ............................................. C08L 33/00
(52) U.S. Cl. ..................... 524/557; 324/47; 324/405; 523/218
(58) Field of Search ................. 524/557, 405, 524/47; 523/218

(56) References Cited

U.S. PATENT DOCUMENTS

| | | |
|---|---|---|
| 5,171,766 A | 12/1992 | Mariano et al. |
| 5,364,892 A | 11/1994 | Miller et al. |
| 5,498,645 A | 3/1996 | Mariano et al. |
| 5,506,280 A | 4/1996 | Miller et al. |
| 5,506,290 A | 4/1996 | Shapero |

FOREIGN PATENT DOCUMENTS

| | | |
|---|---|---|
| JP | 51 125446 | 11/1976 |
| WO | WO 9909095 | 2/1999 |

OTHER PUBLICATIONS

Polyvinyl Alcohol Edited by C..A. Finch © 1992 John Wiley & Sons Ltd, Author:T. Okaya, pp. 16–20.
A.T.Y Cheng & F. Rodriguez,, Mechanical Properties of Borate Crosslinked Poly (vinyl Alcohol) Gels, vol. 26, 26, 3895–3908, 1981.
Polyvinyl Alcohol Edited by. C. A. Finch, © 1992, Chemical Reactions and Stereochemistry of Polyvinyl Alcohol, pp.270–305.
PCT Search Report for PCT/US 01/03744.

*Primary Examiner*—Edward J. Cain
(74) *Attorney, Agent, or Firm*—Ratner & Prestia

(57) ABSTRACT

A moldable composition comprising a polar polymeric resin, present in an amount ranging from 0.5–15% by weight, a filler, present in an amount up to 50% by weight, a thickening agent, present in an amount ranging from 0.1–3% by weight, a humectant, present in an amount up to 30% by weight, and water, present in an amount ranging from 20–70% by weight. Also provided is a method of making the composition as described.

30 Claims, No Drawings

MODELING DOUGH AND METHOD OF MAKING THE SAME

FIELD OF INVENTION

This invention relates generally to moldable compositions, and more specifically, to water-based, polymeric resin doughs which are neither crosslinked nor gelled.

BACKGROUND OF INVENTION

Traditional moldable compositions and modeling doughs incorporated starch as a filler material. Such doughs, however, had a tendency to flake, crack, and crumble in both the wet and dry stages. These traditional doughs would also typically shrink upon drying. Furthermore, these doughs often demonstrated discoloration upon drying and left a residue on the user's hands. Moreover, traditional modeling doughs were characterized by poor plasticity, poor dry strength, and substantial drying shrinkage.

Plasticity is the property of a wet dough or clay that permits deformation by application of a relatively slight pressure and retention of the deformed shape after release of the pressure. This property distinguishes the dough in its wet stage from its dry stage. Traditional starch-based modeling doughs have a tendency to crack when dry and are not easily shaped in the dry state by sanding or filing. Furthermore, the user cannot easily add wet dough to the existing dried sculpture. In addition, traditional starch-based modeling doughs are not carveable after they have dried.

Still another drawback with many conventional water-based doughs is that they are often heavy and difficult to manipulate or mold. Dense, heavy doughs are particularly difficult for children to manipulate. Even in the case of an adult artist, dense, heavy doughs limit the shapes that can be created without the dough falling apart.

As mentioned above, another problem with typical water-based doughs is that they experience a loss of volume (shrinkage) upon drying. Because water accounts for a large portion of the volume of the dough in its wet stage, water loss upon drying results in a loss of volume in the resulting molded product.

Discoloration upon drying is another problem seen with typical water-based doughs and is compounded by the dry shrinkage discussed above. As the volume decreases, the relative concentration of pigment increases and the color darkens. In some cases, other components (e.g. a salt) preferentially precipitate and form a crusty, hazy surface on the dried artifact.

Other drawbacks of conventional water-based doughs include the fact that many of them would leave a residue on the user's hands, and that they can stain or damage textiles, carpets, furniture, etc., with which they come into contact.

Some of the above drawbacks of conventional modeling doughs were addressed through later work on dough formulations which led to the development of water-based modeling doughs comprised of a gelled (crosslinked) polymeric resin, water, and a filler material other than starch. More particularly, these later doughs often used poly(vinyl alcohol) (PVA) as the resin, and added a gellant to cause the crosslinking of the poly(vinyl alcohol). The addition of the gellant, and the subsequent crosslinking of the resin, resulted in a cohesive, water-soluble resin system. When the water evaporated, the dried, gelled, polymer resin material system was durable and lightweight. U.S. Patents which relate to gelling the PVA are: U.S. Pat. No. 5,171,766 to Mariano et al., U.S. Pat. No. 5,364,892 to Miller et al., U.S. Pat. No. 5,498,645 to Mariano et al., and U.S. Pat. No. 5,506,280 to Miller et al.

The above four patents all disclose the use of a gelling agent in conjunction with poly(vinyl alcohol) to form a modeling dough. These references teach that the use of a gelling agent, such as a water soluble borate salt, causes the resin to gel (or crosslink). The result, according to these patents, is a modeling dough which demonstrates wet ductility and low stickiness.

The known doughs incorporating crosslinked poly(vinyl alcohol) were generally pliable, lightweight, left little or no residue, and demonstrated little shrinkage and discoloration upon drying. These later doughs were not without problems, however.

The doughs incorporating crosslinked poly(vinyl alcohol) often demonstrated poor stability, short use time, and stiffer textures. For example, if a fully hydrolyzed poly(vinyl alcohol) co-polymer is used, the product tends to flake because the crosslink density is not high enough. On the other hand, if a partially hydrolyzed poly(vinyl alcohol) co-polymer is used, storage stability and usage time become a problem. The storage problem is due in large part to the fact that as time passes the pH of the system decreases. With lowered pH comes a concomitant reduction in crosslink strength which results in a sticky dough, and a sticky dough does not store well.

A related problem with partially hydrolyzed poly(vinyl alcohol) crosslinked doughs is insufficient usage time. Typically, a user has only about an hour or so to perform the molding he or she desires. This is because once the package is open, exposing the dough to air, rapid further crosslinking occurs and the dough becomes stiff.

Thus, with either fully hydrolyzed poly(vinyl alcohol) doughs, or partially hydrolyzed poly(vinyl alcohol) doughs, problems are encountered. The drawbacks discussed above suggest the need for a water-based modeling dough that has, among others, the properties of pliability, wet ductility, extrudability, joinability, color stability, long usage time, and good storage stability. The compound suggested also ought to accept components intended to meet various needs or expectations of its users, such as colorants or other visual modifiers, tactile modifiers, or odorants.

SUMMARY OF INVENTION

The present invention provides a moldable composition, such as a modeling dough, comprising a polar polymeric resin, a filler, a thickening agent, a humectant, and a solvent. The moldable composition of the present invention provides a pliable dough having good storage stability, wet ductility, extrudability, joinability, color stability, and bouncing ability. Another favorable characteristic of the dough according to the present invention is that it demonstrates good useage time, and does not rapidly dry upon exposure to air. The present invention also provides a method of making a moldable composition which exhibits the above described qualities.

A preferred embodiment of the present invention comprises poly(vinyl alcohol) in an amount ranging from 0.5–15% by weight, a filler in an amount up to 50% by weight, boric acid in an amount ranging from 0.1–3% by weight, a humectant in an amount up to 30% by weight, and water in an amount ranging from 20–70% by weight.

DETAILED DESCRIPTION OF INVENTION

The present invention provides a moldable composition comprising a polar polymeric resin, a filer, a thickening agent, a humectant, and water. This combination of components provides a moldable composition such as a modeling dough having good pliability, storage stability, wet ductility, extrudability, joinability, color stability, and bouncing ability. Another favorable characteristic of the dough according to the present invention is that it demonstrates good usage time, without quickly drying upon exposure to air. The present invention also provides a method of making the dough as described above.

In accordance with the present invention, there is no chemical bond between the polymer chains, (i.e. no crosslinking), but rather a strong association between polymer chains within the system. This structure is more stable than crosslinked polymeric systems because of its high density, low energy association. The structure demonstrates superior pliability compared to the conventional water-based starch doughs because of the presence of a network of intermolecular attractions, instead of crosslinked chemical bonds. The result is a more flexible dough, as compared to a dough comprised of a crosslinked polymer. The intermolecular attraction produces a dough which is resistant to flaking and crumbling, is air-dryable and stable, but provides a long use time.

A typical dough according to the present invention comprises a polar polymeric resin, present in an amount ranging from 0.5–15% by weight, a filler, present in an amount up to 50% by weight, a thickening agent, present in an amount ranging from 0.1–3% by weight, a humectant, present in an amount up to 30% by weight, and water, present in an amount ranging from 20–70% by weight.

The preferred polymeric resin is partially hydrolyzed poly(vinyl alcohol) or its copolymer, because this resin provides a superior dough as compared to some other polar polymeric resins. Other such polymeric resins would include, however, fully hydrolyzed poly(vinyl alcohol), poly (acrylic acid), and combinations thereof.

The preferred filler materials include starch and plastic microspheres. The microspheres may be either hollow or solid and should be between 2 and 100μ in diameter. Other filler materials include calcium carbonate, cellulose fibers, talc, mica, clays, silicates, and mixtures thereof The mixture of microspheres and the other filler materials is advantageous over the use of only one of the filler materials alone. More specifically, where microspheres are used in conjunction with, for example, talc, the talc coats the surface of the microsphere and aids in the wetting of the microsphere surface. This wetting aids in the smooth feel and inhibits stickiness in the dough, thereby improving its handling characteristics.

One preferred microsphere is sold as Dualite® M6001AE (DUALITE is a registered trademark of Pierce & Stevens Corporation of New York, N.Y.). This microsphere is a low density, resilient, polymeric microsphere coated with calcium carbonate. It is a lightweight filler which reduces the density of the dough and thus occupies much of the volume not occupied by water or resin. Generally, other microspheres will work, provided they meet the criteria set forth above.

The thickening agent can be any appropriate inorganic compound, such as $H_3BO_3$, $Ti[OCH(CH_3)_2]_4$, or $TiO(SO_4)$. These compounds form the necessary intermolecular interactions. Boric acid is the preferred thickening agent and is most preferably present at 0.8% by weight.

A humectant is also used in the compound of the present invention to inhibit drying and thereby increase usage time. Several preferred humectants also function as a plasticizer.

The plasticizer increases flexibility of the dough and makes it generally more workable. Materials which function well as both the humectant and plasticizer include glycerin, propylene glycol, triglycerol, poly(ethylene glycol), diethylene glycol, and combinations thereof. These materials decrease the brittleness of the final dough composition while increasing the usage time.

Water is generally used as the solvent. Although tap water is a preferred solvent, it may be advantageous under some circumstances to use deionized water. This is so, generally, because the presence of cations, particularly monovalent cations, can lead to some crosslinking of the polymer resin. It should be noted that complete removal of all cations, even where deionized water is used, is unlikely, and thus some negligible crosslinking of the polymer resin could occur under certain circumstances. For example, in the case where the microspheres are coated with calcium carbonate, it is possible that some divalent cations will be dispersed into the system from the calcium carbonate. This may lead to some degree of crosslinking. As long as the crosslinking is kept to a minimum (preferably to a negligible amount, and most preferably, none), the composition of the present invention will work as described.

In general, when the moldable composition is made, steps should be taken to prevent the formation of cations and subsequent crosslinking. This conscious effort to prevent the formation of cations will lead one skilled in the art to take the necessary steps, many of which are known, to prevent the presence of cations from interfering with the composition as herein described.

The present invention, while outlined above, can also be utilized with many additional components. These additional components include pH adjusters, releasing agents, buffers, defoamers, dispersing agents, scents, preservatives, colors, other visual modifiers, and tactile modifiers.

A typical pH adjuster is triethanolamine. A pH adjuster can be added when the pH of the system gets too low. Generally, molecular interactions are weaker when the pH gets too low. This can be compounded when increased loads of boric acid are introduced. The solution is to add a pH adjuster to raise the pH level of the system.

Releasing agents can also be added to reduce tackiness. Typical releasing agents include mineral oil, petroleum, and silicon wax, all of which are safe to the handler and provide improved feel.

In addition to releasing agents, buffers and defoamers can be added. These types of additives are known to those skilled in the art, and would include phosphoric acid and Foamex® 825, respectively (FOAMEX is a registered trademark of Rhodia Inc., of Cranbury, N.J.).

A preservative can be added to increase shelf life, and a wide variety of preservatives are available. Some examples are Kathon® LX (KATHON is a registered trademark of Rohm & Haas Company of Philadelphia, Pa.), and Nuosept® 95 (NUOSEPT is a registered trademark of Heyden Newport Chemical Corporation of New York, N.Y.).

The following table provides ranges for the component amounts in weight percent. The table also provides the preferred ranges and the most preferred formulation. It is to be understood that where the broadest range is shown, and the low end is zero, that some of each required component must be present, the required components having been set forth above.

| COMPONENT | MOST PREFERED RANGE (wt %) | PREFERRED RANGE (wt %) | RANGE (wt %) | DESCRIPTION OF COMPONENT |
|---|---|---|---|---|
| DI water | 33.45 | 25–40 | 20–70 | Solvent |
| Dualite 6001AE | 15.0 | 10–20 | 5–30 | Microsphere filler |
| Amaizo 875 | 18.0 | 10–30 | 0–50 | Waxy starch filler |
| Cellulose gum 7HF | 0.5 | 0.3–1.5 | 0–3 | Co-binder |
| Boric Acid | 0.8 | 0.3–1.5 | 0.1–3 | Thickening Agent |
| Triethanolamine | 0.9 | 0.4–1.5 | 0–2 | pH adjuster |
| Paraffin Oil | 0.5 | 0.2–1.0 | 0–5 | Releasing Agent |
| Phosphoric acid | 0.25 | 0.1–0.7 | 0–1.5 | Buffer |
| Foamex 825 | 0.28 | 0.1–1 | 0–3 | Defoamer |
| Nopcosperse 44 | 0.56 | 0.1–1 | 0–3 | Dispersing Agent |
| Glycerin | 5.6 | 3–7 | 0–20 | Humectant |
| Propylene Glycol | 20 | 15–25 | 0–30 | Humectant |
| Airvol 523 | 3.92 | 1–6 | 0.5–15 | PVA |
| Kathon LX | 0.06 | 0.02–0.1 | 0–0.5 | Preservative |
| Nuosept 95 | 0.18 | 0.1–0.3 | 0–2 | Preservative |

Airvol® 523 is one example of a poly(vinyl alcohol) which works in the composition of the invention (AIRVOL is a registered trademark of Air Products & Chemicals, Inc. of Allentown, Pa.). Other poly(vinyl alcohols) offered commercially will also work in the present invention. In addition, not all additives, such as colors and scents, are set out in the above table. These can be added, of course, as discussed above.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed is:

1. A moldable composition comprising:
   0.5–15% by weight non-crosslinked polar polymeric resin;
   5–50% by weight filler;
   0.1–3% by weight thickening agent;
   0–30% by weight humectant; and
   20–70% by weight water.

2. The moldable composition of claim 1, wherein said non-crosslinked polar polymeric resin is selected from the group consisting of: fully hydrolyzed poly(vinyl alcohol), partially hydrolyzed poly(vinyl alcohol), poly(acrylic acid), and combinations thereof.

3. The moldable composition of claim 1, wherein said non-crosslinked polar polymeric resin is poly(vinyl alcohol).

4. The moldable composition of claim 1, wherein said thickening agent is boric acid.

5. The moldable composition of claim 1, wherein said filler is comprised of a combination of plastic microspheres and starch.

6. The moldable composition of claim 1, wherein said humectant is selected from the group consisting of glycerin, propylene glycol, triglycerol, poly(ethylene glycol), diethylene glycol, and combinations thereof.

7. The moldable composition of claim 1, wherein said water is deionized water.

8. The moldable composition of claim 1, wherein said filler is selected from the group consisting of: starch, plastic microspheres, calcium carbonate, cellulose fibers, talc, mica, clays, silicates, and mixtures thereof.

9. The moldable composition of claim 1, further comprising a pH adjuster.

10. A moldable composition comprising:
    0.5–15% by weight non-crosslinked poly(vinyl alcohol);
    5–50% by weight filler;
    0.1–3% by weight boric acid;
    0–30% by weight humectant; and
    20–70% by weight water.

11. The moldable composition of claim 10, wherein said filler is selected from the group consisting of: starch, plastic microspheres, calcium carbonate, cellulose fibers, talc, mica, clays, silicates, and mixtures thereof.

12. The moldable composition of claim 10, wherein said filler is comprised of a combination of plastic microspheres and starch.

13. The moldable composition of claim 10, wherein said humectant is selected from the group consisting of glycerin, propylene glycol, triglycerol, poly(ethylene glycol), diethylene glycol, and combinations thereof.

14. The moldable composition of claim 10, wherein said water is deionized water.

15. A moldable composition comprising:
    1–6% by weight non-crosslinked poly(vinyl alcohol);
    20–50% by weight filler;
    0.3–1.5% by weight boric acid;
    18–32% by weight humectant; and
    25–40% by weight water.

16. The moldable composition of claim 15, wherein said filler is comprised of a combination of plastic microspheres and starch.

17. The moldable composition of claim 15, wherein said humectant is selected from the group consisting of glycerin, propylene glycol, triglycerol, poly(ethylene glycol), diethylene glycol, and combinations thereof.

18. A moldable composition comprising:
    3.9% by weight poly(vinyl alcohol);
    15.0% by weight plastic microspheres;
    18% by weight starch;
    0.8% by weight boric acid;
    0.6% by weight a co-binder;
    25.6% by weight humectant; and
    34% by weight water.

19. A method of making a moldable composition comprising the steps of:
    admixing:
       0.5–15% by weight poly(vinyl alcohol);
       5–50% by weight filler;
       0.1–3% by weight boric acid;
       0–30% by weight humectant; and
       20–70% by weight deionized water;
    to form a composition; and
    preventing the crosslinking of said poly(vinyl alcohol).

20. The method of claim 19, wherein said step of preventing the crosslinking of said poly(vinyl alcohol) includes preventing the formation of monovalent cations within the system.

21. A method of preventing the crosslinking of a polar polymeric resin in a moldable composition containing ingredients including polar polymeric resin, filler, a thickening agent, and water, comprising the step of selecting said ingredients so as to minimize the introduction of cations into said composition.

22. The method of claim 21 including the step of selecting said polar polymeric resin as poly(vinyl alcohol).

23. The method of claim 21 including the step of selecting said filler from the group consisting of: starch, plastic microspheres, calcium carbonate, cellulose fibers, talc, mica, clays, silicates, and mixtures thereof.

24. The method of claim 21 including the step of selecting said filler as a combination of plastic microspheres and starch.

25. The method of claim 21 including the step of selecting said water as deionized water.

26. A moldable composition comprising:
 0.5–15% by weight polar polymeric resin;
 5–50% by weight filler;
 0.1–3% by weight boric acid;
 0–30% by weight humectant; and
 20–70% by weight water.

27. The moldable composition of claim 26, wherein said filler is comprised of a combination of plastic microspheres and starch.

28. A moldable composition comprising:
 0.5–15% by weight poly(vinyl alcohol);
 5–50% by weight a combination of plastic microspheres and starch;
 0.1–3% by weight boric acid;
 0–30% by weight humectant; and
 20–70% by weight water.

29. A moldable composition comprising:
 1–6% by weight poly(vinyl alcohol);
 20–50% by weight a combination of plastic microspheres and starch;
 0.3–1.5% by weight boric acid;
 18–32% by weight humectant; and
 25–40% by weight water.

30. A method of preventing the crosslinking of a polar polymeric resin in a moldable composition containing ingredients including polar polymeric resin, a filler comprised of a combination of plastic microspheres and starch a thickening agent, and water, comprising the step of selecting said ingredients so as to minimize the introduction of cations into said composition.

* * * * *